(12) United States Patent
Fujioka

(10) Patent No.: US 10,144,251 B2
(45) Date of Patent: Dec. 4, 2018

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 0 days.

(21) Appl. No.: 14/942,027

(22) Filed: Nov. 16, 2015

(65) Prior Publication Data

US 2016/0137002 A1 May 19, 2016

(30) Foreign Application Priority Data

Nov. 18, 2014 (JP) .................................. 2014-233820

(51) Int. Cl.
| | |
|---|---|
| *B60C 11/03* | (2006.01) |
| *B60C 11/11* | (2006.01) |
| *B60C 11/04* | (2006.01) |
| *B60C 11/12* | (2006.01) |
| *B60C 11/13* | (2006.01) |

(52) U.S. Cl.
CPC ............ *B60C 11/032* (2013.01); *B60C 11/04* (2013.01); *B60C 11/11* (2013.01); *B60C 11/12* (2013.01); *B60C 11/13* (2013.01); *B60C 11/0306* (2013.01); *B60C 2011/0346* (2013.01)

(58) Field of Classification Search
CPC .............................. B60C 11/032; B60C 11/04
See application file for complete search history.

(56) References Cited

U.S. PATENT DOCUMENTS

| | | | | |
|---|---|---|---|---|
| 2,152,883 | A * | 4/1939 | Harrison | B60C 11/12 152/209.18 |
| 5,160,385 | A | 11/1992 | Goto et al. | |
| D644,985 | S * | 9/2011 | Fujioka | D12/600 |
| 8,272,415 | B2 | 9/2012 | Itou | |
| 2004/0112499 | A1* | 6/2004 | Nishimori | B60C 11/032 152/558 |

(Continued)

FOREIGN PATENT DOCUMENTS

| | | |
|---|---|---|
| CN | 203485682 U | 3/2014 |
| CN | 105584300 A | 5/2016 |

(Continued)

OTHER PUBLICATIONS

Office Action dated Dec. 29, 2016, issued in counterpart Chinese Patent Application No. 2015107849911, with English translation. (14 pages).

(Continued)

*Primary Examiner* — Jacob T Minskey
*Assistant Examiner* — Cedrick Williams
(74) *Attorney, Agent, or Firm* — Westerman, Hattori, Daniels & Adrian, LLP

(57) ABSTRACT

On a tread portion, a plurality of blocks defined by a plurality of main grooves and a plurality of transverse grooves. The main grooves annularly and continuously extend in a tire circumferential direction. The transverse grooves extend in a tire width direction so as to intersect the main grooves. The plurality of blocks include a center block located at a center in the tire width direction and having, on a surface thereof, a first groove with closed both ends and a second groove joining the first groove.

7 Claims, 4 Drawing Sheets

(56) References Cited

U.S. PATENT DOCUMENTS

| | | | |
|---|---|---|---|
| 2004/0238092 A1* | 12/2004 | Colombo | B29D 30/0606 |
| | | | 152/209.15 |
| 2009/0218020 A1* | 9/2009 | Sumi | B60C 11/12 |
| | | | 152/209.18 |
| 2010/0000586 A1* | 1/2010 | Hendrickson | D06F 39/00 |
| | | | 134/56 D |
| 2012/0000586 A1* | 1/2012 | Kami | B60C 11/0306 |
| | | | 152/209.18 |
| 2012/0060989 A1* | 3/2012 | Kuwajima | B60C 11/12 |
| | | | 152/209.18 |
| 2014/0000776 A1 | 1/2014 | Nakamura | |
| 2015/0090382 A1* | 4/2015 | Mayni | B60C 11/0316 |
| | | | 152/209.17 |
| 2016/0129733 A1 | 5/2016 | Fujioka | |

FOREIGN PATENT DOCUMENTS

| | | |
|---|---|---|
| JP | 03-79406 A | 4/1991 |
| JP | 2004-98914 A | 4/2004 |
| JP | 2011-11696 A | 1/2011 |
| JP | 2013-151235 A | 8/2013 |
| JP | 2014-8904 A | 1/2014 |
| WO | WO 2012087272 A1 * 6/2012 | ......... B60C 11/0316 |
| WO | WO-2012087272 A1 * 6/2012 | ......... B06C 11/0316 |

OTHER PUBLICATIONS

Office Action dated Nov. 25, 2016, issued in counterpart Canadian Patent Application No. 2,911,630. (4 pages).
Office Action dated Jun. 14, 2017, issued in counterpart Chinese Application No. 201510784991.1, with English translation. (11 pages).
Office Action dated Sep. 14, 2017, issued in counterpart Canadian Patent Application No. 2,911,630. (3 pages).
Office Action dated Feb. 11, 2018, issued in counterpart Chinese Application No. 201510784991.1, with English translation. (17 pages).
Office Action dated Mar. 27, 2018, issued in counterpart Japanese Application No. 2014-233820, with English translation. (6 pages).
Office Action dated Jun. 5, 2018, issued in counterpart Canadian Application No. 2911630. (4 pages).

* cited by examiner

PNEUMATIC TIRE

CROSS-REFERENCE TO RELATED APPLICATION

This application claims priority of Japanese Patent Application No. 2014-233820 flied on Nov. 18, 2014, the content of which is incorporated herein by reference.

BACKGROUND OF THE INVENTION

Technical Field

The present invention relates to a pneumatic tire.

Description of the Related Art

A publicly-known conventional pneumatic tire comprising, on a tread portion, a plurality of lands defined by at least one or more annular circumferential grooves continuously extending in a circumferential direction, and a plurality of closed grooves. The plurality of grooves extend so as to intersect one another at one or more intersections on a surface of the land and have both ends terminated within the surface. The plurality of grooves form an intersection groove having a radial portion extending in at least three directions from the intersection of the closed grooves (e.g., refer to JP 2013-151235 A).

However, in the above conventional pneumatic tire, the intersection groove is provided on shoulder portions, and moreover on longitudinal sipes. Therefore, it is difficult to improve traction performance (traction: ability to transmit a driving force of a tire to a road surface) forming the intersection groove. Further, since the conventional pneumatic tire is not a type where blocks are formed on the tread portion, there is no disclosure or suggestion of a construction which such intersection groove is provided on a center block having high contact pressure on a road surface.

SUMMARY OF THE INVENTION

It is an object of the present invention to provide a pneumatic tire which can improve traction performance at a center block having high contact pressure on a road surface, while maintaining wear resistance and uneven wear resistance.

As means for solving the above problem, the present invention provides a pneumatic tire comprising, on a tread portion, a plurality of blocks defined by a plurality of main grooves and a plurality of transverse grooves, the main grooves annularly and continuously extending in a tire circumferential direction and the transverse grooves extending in a tire width direction so as to intersect the main grooves, wherein the plurality of blocks include a center block located at a center in the tire width direction and having, on a surface thereof, a first groove with closed a both ends and a second groove joining the first groove.

With this arrangement, when the center block contacts the road surface, the center block can exert a force on the road surface not only through the outer edge but also through the inner edge forming the first and second grooves. Therefore, traction performance of the tire can be improved. Further, since both the ends of the first and second grooves are closed on the surface of the center block, excessive deformation of the center block, or deformation of the center block in a different shape under contact pressure hardly occurs. Therefore, wear or uneven wear hardly occurs to the center block in spite of that the first and second grooves are formed.

It is preferred that a joining point of the first groove and the second groove coincides with a centroid position of the center block.

With this arrangement, the first and second grooves can be arranged in a balanced manner with respect to the center block. Therefore, the center block is hardly deformed in a different shape due to deformation when contact pressure is exerted, so that uneven wear hardly occurs.

It is preferred that a width dimension w of the first and second grooves satisfies 2 mm≤w≤5 mm.

This arrangement can prevent that the desired traction performance cannot be exhibited due to narrow groove width, as well as that wear or uneven wear is liable to occur due to too large groove width is too large.

It is preferred that a ratio Rd of a depth dimension of any one of the first and second grooves to a depth dimension of the main groove satisfies following relation 5%≤Rd≤40%.

This arrangement can prevent that the desired, performance cannot be exhibited because the groove depth is shallow due to shallow groove depth, as well as that wear or uneven wear due to deformation is liable to occur due to too deep groove depth.

It is preferred that a ratio Rs of an opening area of any one of the first and second grooves occupying the surface of the center block satisfies 0%<Rs≤20%.

With this arrangement, it does not happen that the center block is deformed more than necessary under contact pressure, so that wear or uneven wear hardly occurs.

It is preferred that the first and second grooves are provided so as to slant with respect to a straight line extending in the tire circumferential direction in a development view of the tread portion.

With this arrangement, when the inner edge forming the groove contacts the road surface, the contact pressure can be exerted on both the tire circumferential direction and the tire width direction.

It is preferred that the first and second grooves cross with each other to form an intersection groove.

It is preferred that the center block has a polygonal form obtained combinations of a plurality of pairs of parallel outer edges, that the first groove is arranged parallel to any one of the pairs the outer edges, and that the second groove is arranged parallel to another one of the pairs of the outer edges.

With this arrangement, it is possible to lay out the first and second grooves in a balanced manner, thus making it possible to sufficiently suppress the occurrence of wear or uneven wear.

According to the present invention, since the first and second grooves closed at both ends are formed in the center block, force can be exerted on the road surface not only through the outer edge if the center block but also through the inner edge forming the grooves, thus making it possible to improve traction performance. Further, since the respective grooves are closed at both the ends, the center block is hardly deformed in a different shape under contact pressure. Therefore, wear or uneven wear hardly occurs.

DETAILED DESCRIPTION OF THE PREFERRED EMBODIMENTS

The present invention will hereinafter be described with reference to the attached drawings. The following description is essentially a mere illustration, and is not intended to limit the present invention, its application, or its use. The drawings are schematic, and ratios of the respective dimensions are different from actual ones.

Figure 1:
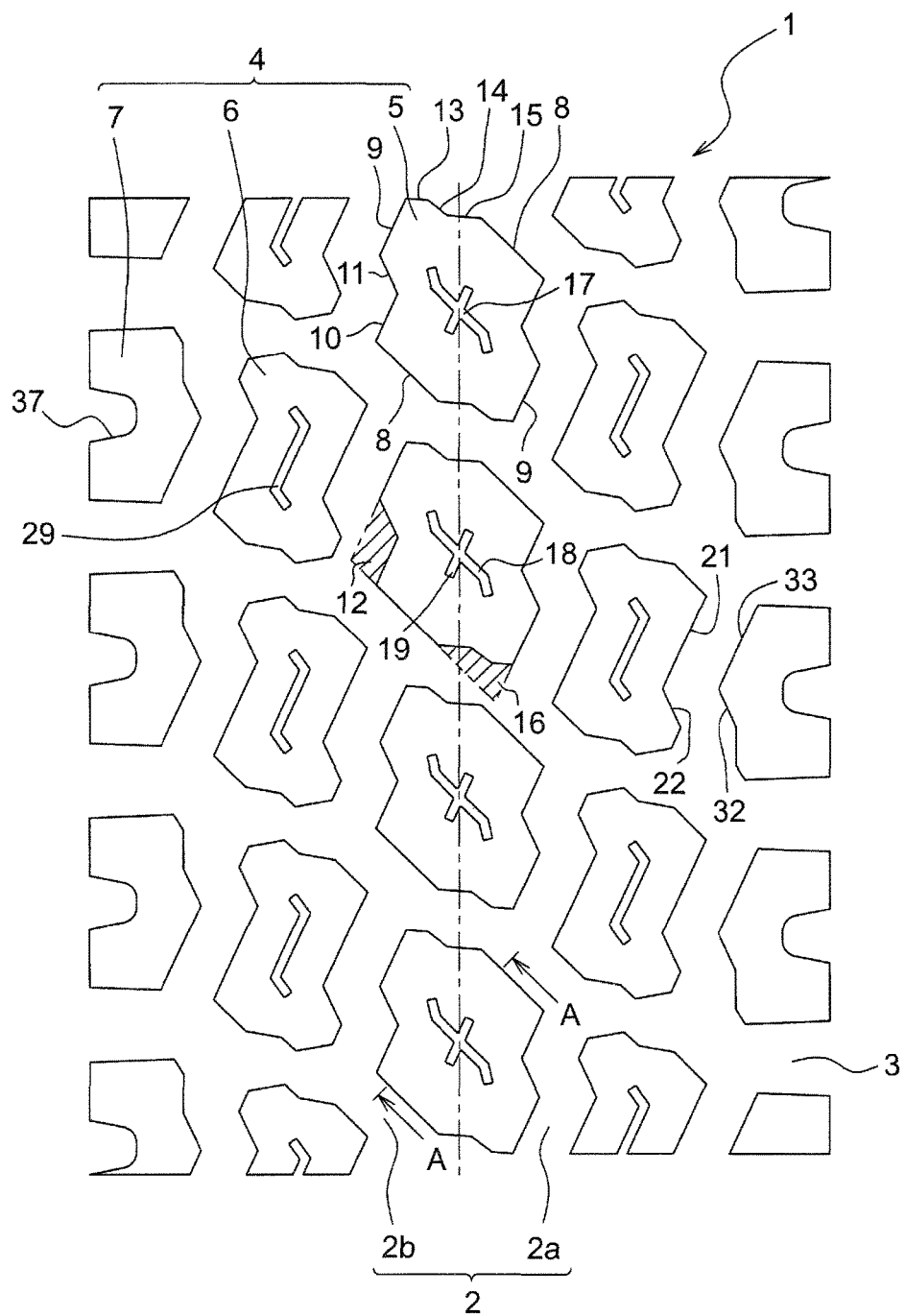
FIG. 1 is a development view showing a part of tread portion of a pneumatic tire according to one embodiment.

FIG. 1 shoes a development view of a tread portion 1 of a pneumatic tire of the present embodiment. Formed in the tread portion 1 are a plurality of main grooves 2 annularly and continuously extending in a tire circumferential direction, and a plurality of transverse grooves 3 extending in a tire width direction and intersecting the main grooves 2. Herein, each of the main grooves 2 has a zigzag-shape, and four main grooves 2 are formed at predetermined intervals in the tire width direction. Each of the transverse grooves 3 is provided so as to slant with respect to an imaginary straight line extending in the tire width direction. A plurality of blocks 4 are defined by the main grooves 2 and the transverse grooves 3.

The blocks 4 includes center blocks 5 arranged in the tire circumferential direction at the center of the tire width direction, mediated blocks arranged on both sides thereof, and side blocks 7 arranged on further outsides thereof.

When the tread portion 1 is seen in plan view, each center block 5 is formed in a shape obtained by cutting off four corners of a parallelogram surrounded by a pair of mutually parallel long sides 8 and a pair of mutually park short sides 9. Formed at one of the two pairs of diagonally positioned corners are a first cutoff side 10 parallel to each short side 9, and a second cutoff side 11 more slanted than a straight line parallel to each long side 8 (an area cut off to the first cutoff line 10 and the second cutoff line 11 from the original shape of the parallelogram will hereinafter be referred to as a first cutoff portion 12).

The other pair of corners is cut off so that three zigzag-shaped sides (a third cutoff side 13, a fourth cutoff side 14, and a fifth cutoff side 15) are obtained (an area cut off to these three sides from the original shape of the parallelogram will hereinafter be referred to as a second cutoff portion 16).

Figure 2:
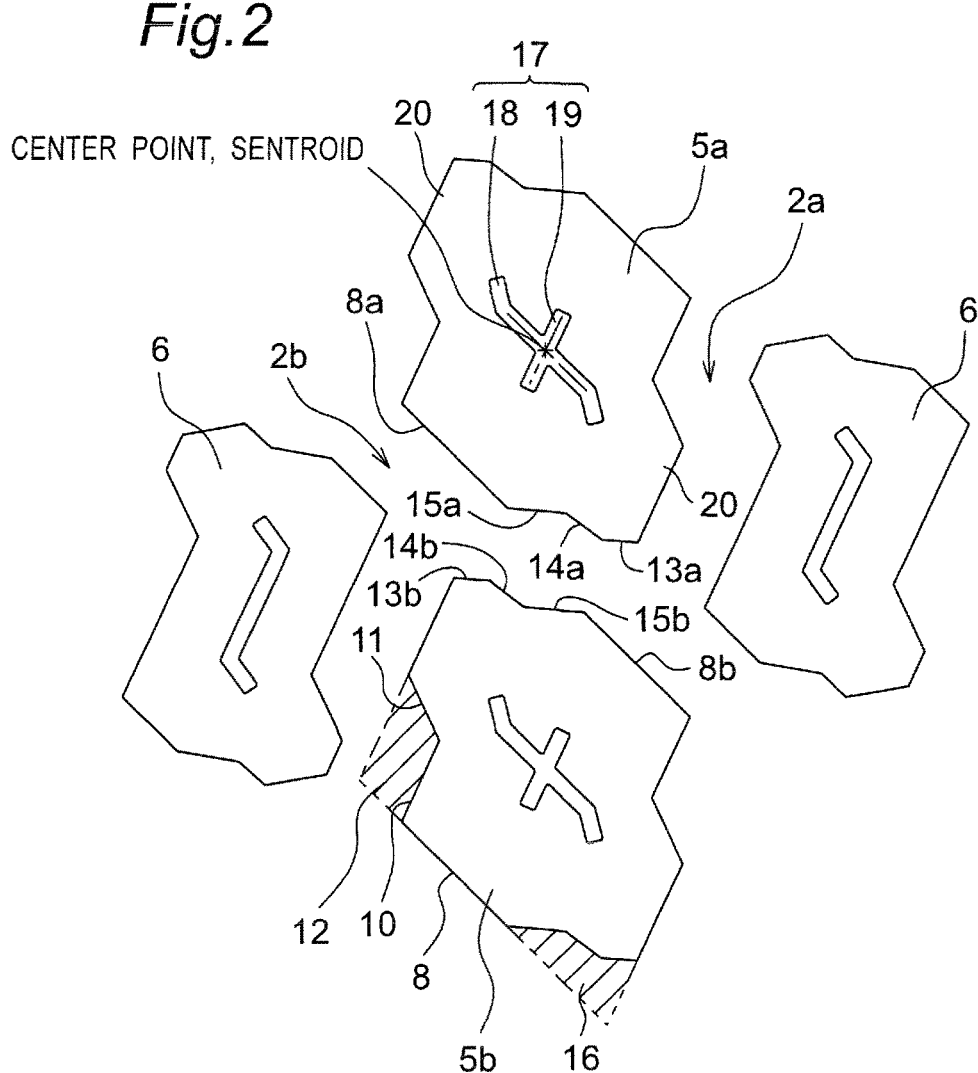
FIG. 2 is an enlarged view of center blocks and mediate blocks of FIG. 1.

Herein, as shown in FIG. 2, the second cutoff portion 16 will be described in detail with reference to two adjacent center blocks 5 (a first center block 5a and a second center block 5b).

In the first center block 5a, a third cutoff side 13a is gradually inclined inward of the transverse groove 3 from a first main groove 2a, a fourth cutoff side 14a is subsequently gradually inclined outward, a fifth cutoff side 15a is gradually inclined inward, and then a long side 8a is gradually inclined outward to reach a second main groove 2b. On the other hand, in the second center block 5b, a long side 8b is gradually inclined inward of the transverse groove 3 from the main groove 2a, a fifth cutoff side 15b is subsequently gradually inclined outward, a fourth cutoff side 14b is gradually inclined inward, and then a third cutoff side 13b is gradually inclined outward to reach the second main groove 2b.

Thus, from the first main groove 2a toward the second main groove 2b, a width dimension of the transverse groove 3 is gradually reduced due to the third cutoff side 13a of the first center block 5a and the long side 8b of the second center block 5b. Subsequently, the width dimension of the transverse groove 3 is gradually increased due to the fourth cutoff side 14a of the first center block 5a and the fifth cutoff side 15b of the second center block 5b. Then, the width dimension of the transverse groove 3 is gradually reduced due to the fifth cutoff side 15a of the first center block 5a and the fourth cutoff side 14b of the second center block 5b. Thereafter the width dimension of the transverse groove 3 is gradually increased due to the long side 8a of the first center block 5a and the third cutoff side 13b of the second center block 5b to reach the second main groove 2b.

As shown in FIG. 2, an intersection groove 17 is formed on a surface of the center block 5. The intersection groove 17 includes a first groove 18 extending on a center line parallel to the long sides 8 of the center block 5, and a second groove 19 extending on a center line parallel to the short sides 9 of the center block. The first groove 18 is longer than the second groove 19, and both of them are formed so as to have the same width and depth. The first groove 18 and the second groove 19 are intersected at right angles to each other at the center, and an intersection of the center lines of the respective grooves coincides with a centroid position of the center block 5. Further, both ends of the first groove 18 and the second groove 19 are terminated (closed) within the surface of the center block 5 so that they are not open to side surfaces of the center block 5. This will secure a sufficient distance from each position of the intersection groove 17 to an outer edge of the center block 5. Both ends of the first groove 18 are bent conforming to the shape of a projection defined by the first cutoff portion 12 and the second cutoff portion 16. That is, both the ends of the first groove 18 extend respectively in directions in which the projection 20 of the center block 5 protrudes.

Figure 3:
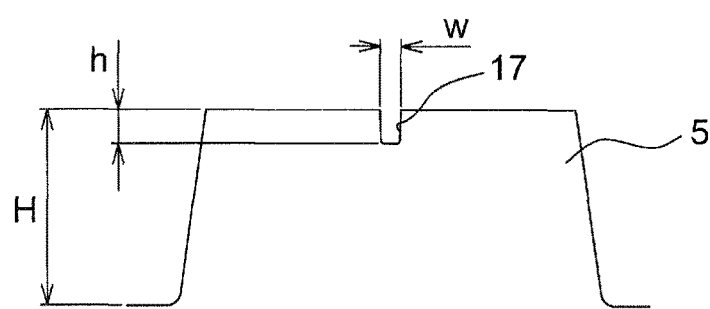
FIG. 3 is a cross-sectional view taken along line A-A of FIG. 1.

As shown in FIG. 3, a groove width w of the intersection groove 17 is set to 2 mm≤w≤5 mm. The reason therefor is as follows: If the groove width w is narrower than 2 mm, gripping of the road surface edges on both sides forming the groove (inner edge) becomes insufficient, so that traction performance deteriorates. If it is wider than 5 mm, rigidity of the center block 5 itself deteriorates, so that it is deformed more than necessary, becoming a cause of the occurrence of wear or uneven wear.

A groove depth of the intersection groove 17 is set as follows: That is, a ratio (groove percentage) Rd of depth dimension (groovy depth) h of the intersection groove 17 to a depth dimension H of the main groove 2 shown in FIG. 3 is set to 5%≤Rd≤40%. The reason therefor is as follows: If the groove percentage Rd is less than 5%, traction performance of the center block 5 deteriorates. If it exceeds 40%, rigidity of the center block 5 itself deteriorates, becoming a cause of the occurrence of wear or uneven wear.

When the center block 5 is seen in plan view, a ratio Rs of the intersection groove 17 to a surface area of its entire upper surface is set to 0%<Rs≤20%. If this ratio Rs exceeds 20%, rigidity of the center block 5 deteriorates, becoming a cause of the occurrence of wear or uneven wear.

In this manner, the intersection groove 17 consisting of the first groove 18 and the second groove 19 is arranged at a central portion of the surface of the center block 5, and has a predetermined width. Therefore, while suppressing the occurrence of wear or uneven wear by restricting deformation of the center block 5 when it contact the ground, an open end (inner edge) forming the intersection groove 17 appropriately acts on the road surface to exhibit the desired traction performance.

Figure 4:
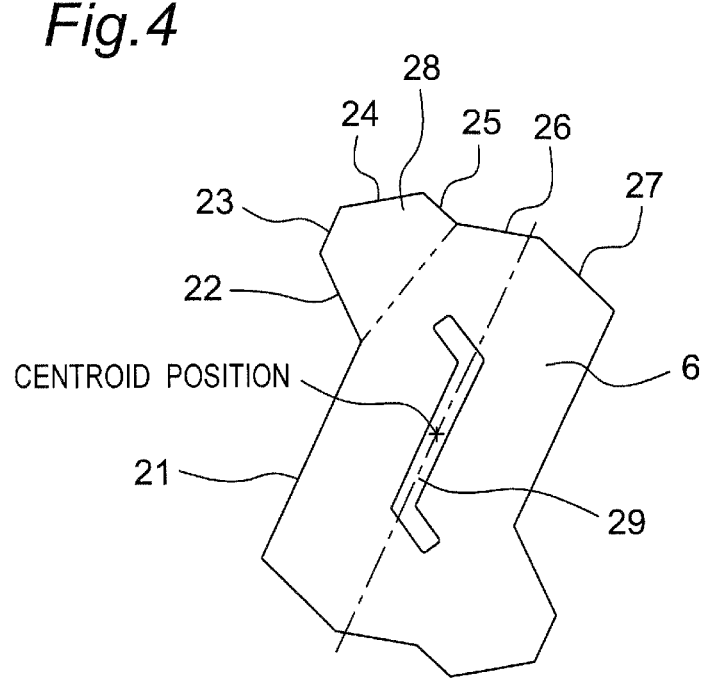
FIG. 4 is an enlarged view of a mediate block of FIG. 1.

As shown in FIG. 4, each mediated block 6 has a roughly rectangular shape, and a half thereof consists of a first side 21, a second side 22, a third side 23, a fourth side 24, a fifth side 25, a sixth side 26, and a seventh side 27. The other half are formed at point-symmetrical positions around the centroid position. Projecting portions 28 are formed at a pair of diagonally positioned corners. Each projecting portion 28 consists of the second to fifth sides 22-25. As shown in FIG. 1, the second side 22 and the third side 23 are parallel to the first cutoff side 10 and the second cutoff side 11 of the center block 5, respectively. A closed groove 29 is formed at a central portion of the mediate block 6. The closed groove 29 is arranged on a center line along the first side 21, and its both ends are respectively bent in projection directions of the projecting portions 28.

Figure 5:
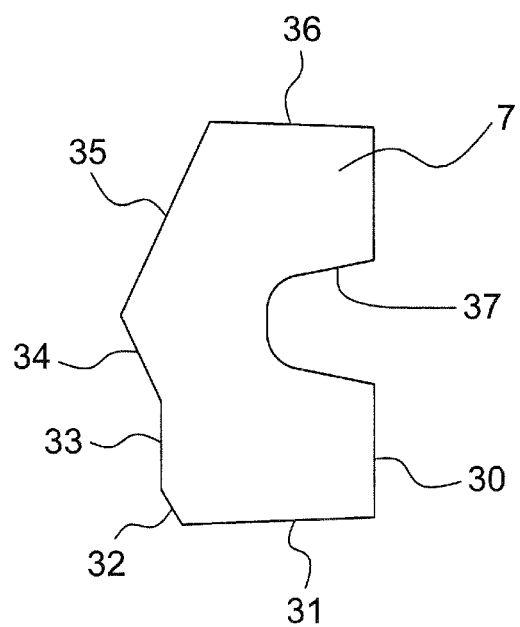
FIG. 5 is an enlarged view of a side block of FIG. 1.

As shown in FIG. 5, when the tread portion 1 is seen in plan view, each side block 7 consists of a first side 30, a second side 31, a third side 32, a fourth side 33, a fifth side 34, a sixth side 35, and a seventh side 36. The seventh side 36, namely a side surface, forms a shoulder portion, and a groove 37 extending in a tire radial direction is formed in its central portion. As shown in FIG. 1, the third side 32 of the side block 7 is parallel to the second side 22 of the mediate block 6, and the fourth side 33 is parallel to the first side 21.

In the pneumatic tire on which the tread patterns with the above construction are formed, when a vehicle travels with such tires mounted, it operates as follows:

That is, when the pneumatic tire contacts the road surface, the tread portion 1 is deformed, and the contact pressure at the center block 5 becomes the highest. In the center block 5, the intersection groove 17 is formed on the surface. Therefore, when the center block 5 contacts the road surface, a force is exerted not only on its outer edge but also on its inner edge forming the intersection groove 17.

Further, since the intersection groove 17 is formed, the force exerted on the inner edge reaches not only the tire circumferential direction but also the tire width direction. Therefore, the traction performance can be greatly improved compared with a center block 5 having no intersection groove 17.

Also, both the ends of the first groove 18 and the second groove 19 forming the intersection groove 17 are closed within the surface of the center block 5, and they are not open to the side surfaces. Therefore, the deformation amount of the center block 5 when it contacts the ground is suppressed, and it is hardly deformed in a different shape. Therefore, wear or uneven wear hardly occurs to the center block 5.

Further, although the mediate block 6 is also brought into pressure contact with the road surface when the center block 5 contacts the ground, its pressure-contact force is weaker than that of the center block 5. Also, the closed groove 29 is formed in the mediate block 6. Therefore, the mediate block 6 is deformed, but not deformed to such an extent until it becomes an extremely different shape. Therefore, wear or uneven wear hardly occurs. Furthermore, when brought into pressure contact with the road surface, the inner edge forming the closed groove 29 acts on the road surface, so that the sufficient traction performance is exhibited.

From the above, according to the pneumatic tire on which the tread patterns with the above construction are formed, since the intersection groove 17 is formed in the block 4, in particular in the center block 5, the tire has a number of edges capable of transmitting a driving force to the road surface. Therefore, it has excellent traction performance. Further, both the ends of the first groove 18 and the second groove 19 forming the intersection groove 17 are both closed (terminated) within the surface of the center block 5. Therefore, the center block 5 is not deformed more than necessary, so that wear or uneven wear hardly occurs.

The present invention is not limited to the construction described in the above embodiment, and various modifications can be made.

Figure 6:
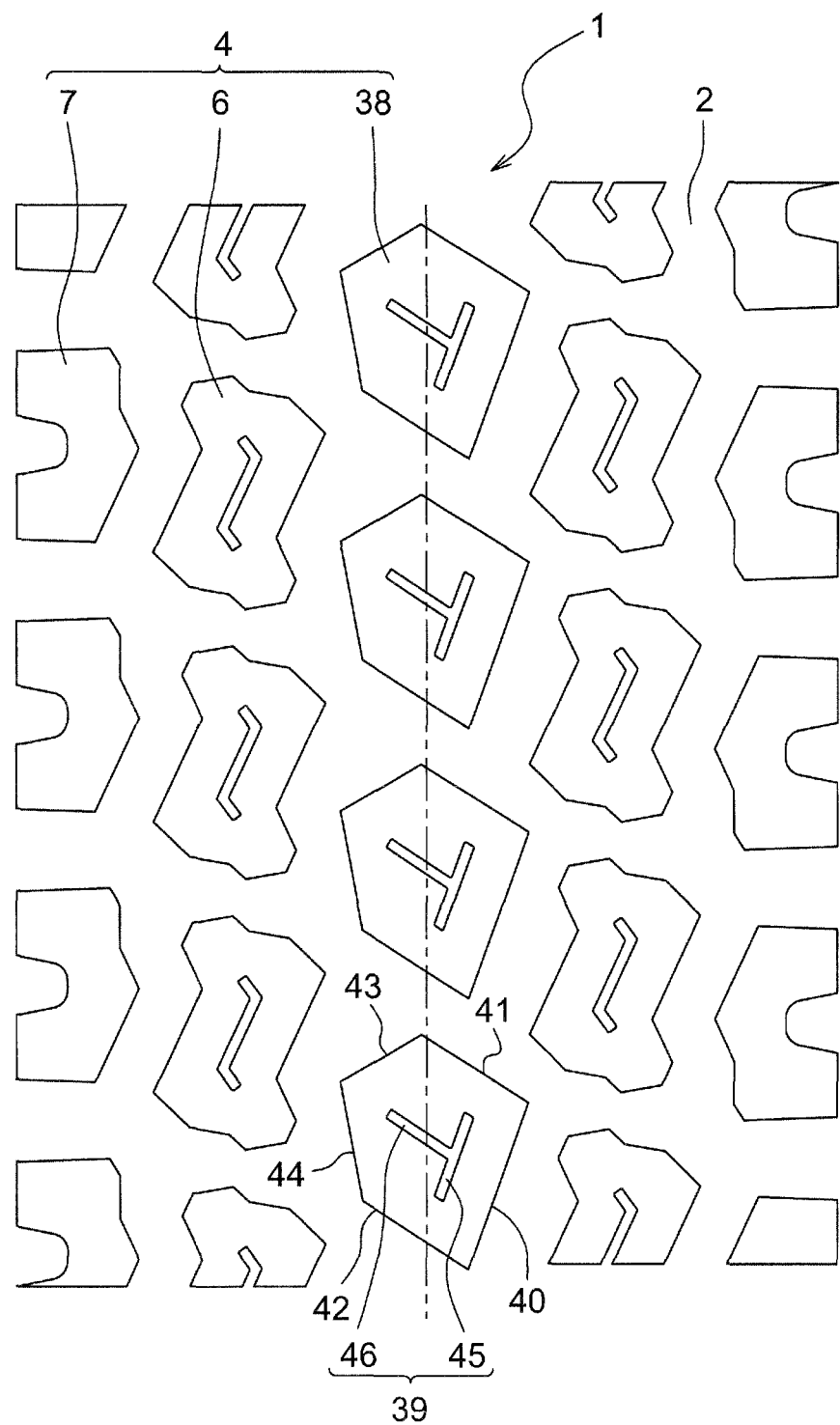
FIG. 6 is a development view showing a part of a tread portion of a pneumatic tire of another embodiment.

In the above embodiment, the intersection groove 17 is formed in the center block 5. For example, as shown in FIG. 6, in case of a pentagonal center block 38, a T-shaped groove 39 may be formed. In more detail, the center block 38 consists of a first side 40, second and third sides 41 and 42 extending from its both ends, which are parallel to each other, fourth and fifth sides 43 and 44 extending obliquely from their respective, ends to be joined. The T-shaped groove 39 consists of a first groove 45 and a second groove 46. The first groove 45 extends parallel to the first side 40. The second groove 46 extends from a central portion of the first side 40 to a joining point of the fourth side 43 and the fifth side 44.

In this manner, the groove shape can be freely set in accordance with the shape of the center block 5. Thereby, the groove shape is made suitable for the shape of the center block 5, achieving the well-balanced deformation hardly causing wear or uneven wear when it contacts the ground.

What is claimed is:

1. A pneumatic tire, comprising, on a tread portion, a plurality of blocks defined by a plurality of main grooves and a plurality of transvers grooves, the main grooves annularly and continuously extending in a tire circumferential direction, and the transverse grooves extending in a tire width direction so as to intersect the main grooves,
   wherein the plurality of blocks include a center block located at a center in the tire width direction and having, on a surface thereof, a first groove with closed both ends and a second groove joining the first groove,
   wherein the first groove and the second groove have a predetermined width in an unstressed condition,
   wherein each of the blocks has a polygonal form having more than three pairs of parallel outer edges, the polygonal form being obtained by cutting off four corners of a parallelogram, and
   wherein the first groove is arranged parallel to any one of the pairs of the outer edges, and the second groove is arranged parallel to another one of the pairs of the outer edges,
   wherein a ratio Rs of an opening area of any one of the first and second grooves occupying the surface of the center block satisfies following relation: 0%<Rs<20%.

2. The pneumatic tire according to claim 1, wherein a joining point of the first groove and the second groove coincides with a centroid position of the center block.

3. The pneumatic tire according to claim 1, wherein a width dimension w of the first and second grooves satisfies following relation: 2 mm≤w≤5 mm.

4. The pneumatic tire according to claim 1, wherein a ratio Rd of a depth dimension of any one of the first and second grooves to a depth dimension of the main groove satisfies following relation: 5%≤Rd≤40%.

5. The pneumatic tire according to claim 1, wherein the first and second grooves are provided so as to slant with respect to a straight line extending in the tire circumferential direction in a development view of the tread portion.

6. The pneumatic tire according to claim 1, wherein the first and second grooves cross with each other to form an intersection groove.

7. The pneumatic tire according to claim 1, wherein the center block has a polygonal form obtained by combinations of a plurality of pairs of parallel outer edges, and wherein the first groove is arranged parallel to any one of the pairs of the outer edges, and the second groove is arranged parallel to another one of the pairs of the outer edges.

* * * * *